Dec. 6, 1938.  R. T. HARRIS  2,138,967
COOKING BASKET
Filed Feb. 1, 1938
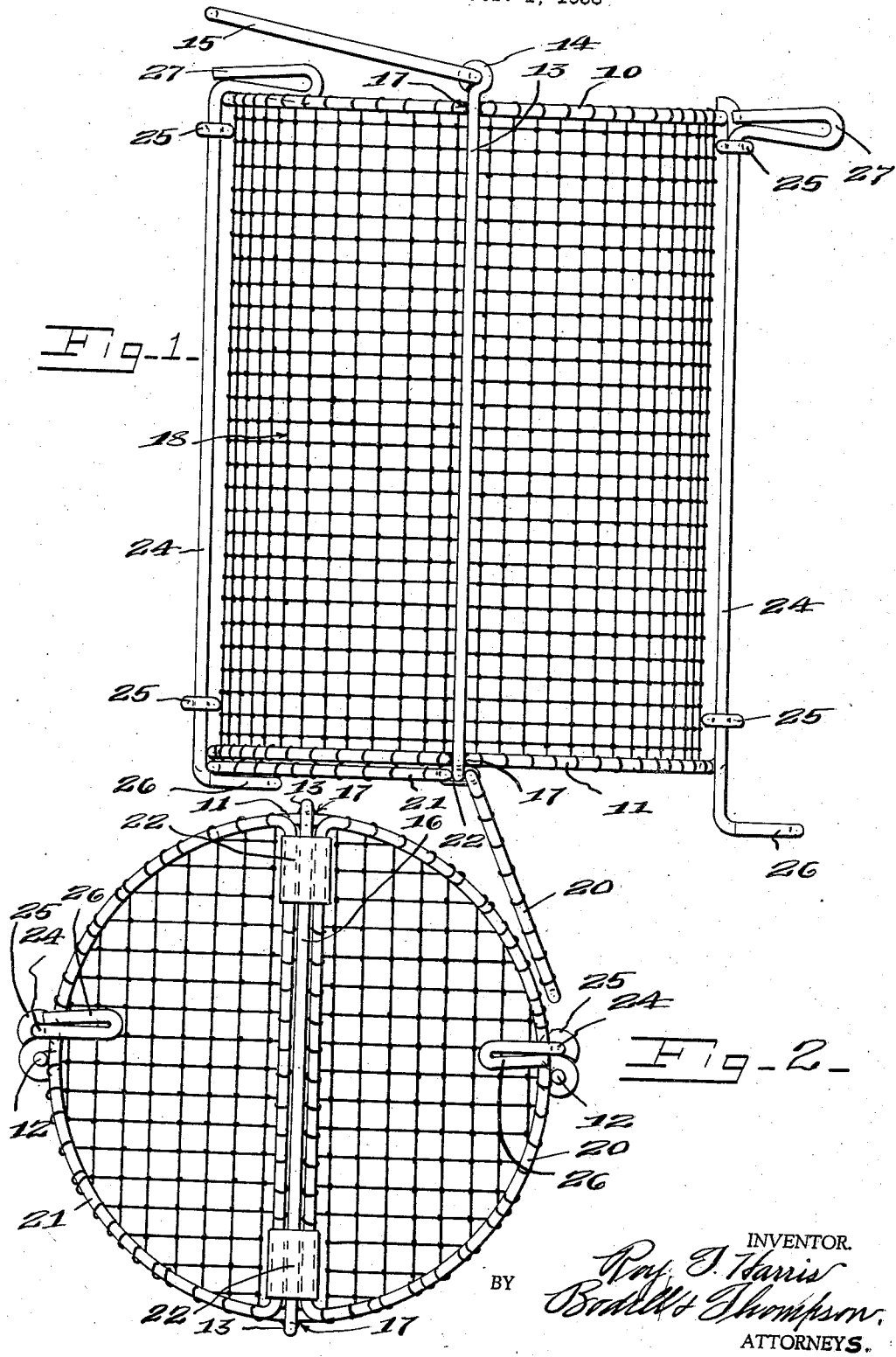
INVENTOR.
Ray T. Harris
BY
ATTORNEYS.

Patented Dec. 6, 1938

2,138,967

UNITED STATES PATENT OFFICE 2,138,967

COOKING BASKET

Roy T. Harris, Syracuse, N. Y., assignor of one-half to Ralph D. Rownd, Syracuse, N. Y.

Application February 1, 1938, Serial No. 188,122

4 Claims. (Cl. 53—1)

This invention relates to baskets of the type employed in cooking vegetables in hot liquids, such for example as boiling potatoes in a kettle of hot water. If the vegetables are cooked directly in the water, it is difficult to drain off the boiling water after the vegetables are cooked and simultaneously retain the vegetables in the kettle. This is particularly true in restaurants and the like, where a large amount of vegetables are cooked in large heavy kettles. Baskets of the type herein referred to are employed to minimize the hazard of the cook, or chef, being scalded during this draining manipulation.

The vegetables are placed in the basket and the basket immersed in the boiling water, and after the vegetables have been cooked the basket and the cooked vegetables therein are conveniently removed from the boiling water. Thereafter, draining the boiling water from the kettle is a comparatively simple task.

After the vegetables have been cooked and removed from the boiling water, it is necessary to empty the cooked vegetables into a suitable container whereby they may be further processed. For example, the boiled potatoes are generally placed in a container and beaten or mashed. It is usually desirable to empty the cooked vegetables back into the same kettle after the boiling water has been emptied therefrom.

My invention has as an object a basket of the type referred to which, because of the particularly economical and novel structure employed, may be of maximum dimension for a given size kettle, and which is provided with a pair of bottom sections hinged in such manner that they may swing to open position while the basket is in the kettle, and which bottom sections are latched into closed position, the latches being conveniently operable from the top of the basket to individually and separately release the bottom sections.

The invention consists in the novel features and in the combinations and constructions hereinafter set forth and claimed.

In describing this invention, reference is had to the accompanying drawing in which like characters designate corresponding parts in all the views.

Figure 1 is a side elevation of a basket embodying my invention illustrating one of the bottom sections in latched position, and the other bottom section in open position.

Figure 2 is a bottom plan view with both bottom sections in latched position.

The body portion of the basket may be of any suitable form and construction, preferably of cylindrical form consisting of a frame, the parts of which are formed of heavy wire or rods and to which is secured a cylinder formed of heavy wire screen.

The frame consists of upper and lower ring members 10, 11 which are held in spaced apart relationship by rods 12 secured at their ends to the respective ring members as by welding, brazing etc. The frame further includes a pair of rods 13 extending from the lower ring member 11 to the upper ring member 10 and being formed at their upper ends with eyes 14 to receive the ends of a handle or bail 15. The rods 12, 13 are equally spaced about the circumference of the rings 10, 11, and a supporting rod 16 extends diametrically across the bottom end of the body and is secured at its ends to the frame or lower ring 11 adjacent the lower ends of the rods 13. As here shown, the rod 16 is integral with the rods 13 which makes for a more economical and rigid structure. It is to be understood that the rod formation 13, 16 is welded or otherwise secured to the ring members 10, 11, as at 17, Figure 2. The wire cylinder 18 is secured at its ends to the ring members 10, 11.

The bottom consists of a pair of bottom sections each including a semi-circular frame formed of rod material similar to the frame of the body portion and a screen secured thereto. The bottom sections 20, 21 are arranged on each side of the supporting rod 16 and with their straight edges arranged adjacent the rod 16 and extending parallel therewith and with their arcuate edges arranged in register with the lower ring member 11. These bottom sections 20, 21 are separately hinged to the supporting rod 16 as at 22, and each bottom section is free to move about its hinged joints into open and closed position, as illustrated in Figure 1.

A latch member is provided for latching each of the bottom sections 20, 21 into closed position, and these latch members are operable at the upper end of the basket. As here shown, the latch members are formed of the same material as the frame of the basket, and consists of a rod 24 journalled in brackets 25 secured to the rods 12. The lower end of the rod 24 is formed with a loop 26 to engage the arcuate edge of the adjacent bottom section, and the upper end of the rod is formed with a loop 27 which serves as a handle or operating manual. The loops 26, 27 extend radially from the rod 24 in the same direction whereby when the lower loop 26 is moved under the edge of the bottom section, the upper loop 27 is moved over the upper ring member 10.

I am aware of the fact that baskets of this type have been made with a bottom hinged to one side of the body, the bottom being releasable from the upper end of the basket. However, such baskets are not practical in operation and are not in general use.

An important feature of my invention resides in the semi-circular bottom sections hingedly connected at their straight edges to the supporting rod 16 and being detachably secured at their arcuate edges by the latch members. I have found this structure to be particularly rigid and durable and most conveniently operated.

What I claim is:

1. A basket of the type described comprising a cylindrical portion open at the ends, a supporting member extending diametrically across the bottom end and being secured to said cylindrical portion, a semi-circular bottom section arranged on each side of said supporting member and being hinged thereto, means carried by the cylindrical portion and being operable to maintain said bottom sections in closed position and being operable to separately release said bottom sections.

2. A basket of the type described comprising a cylindrical body portion open at the ends and a pair of semi-circular bottom sections arranged with their straight edges extending diametrically across the bottom end of the body portion, means pivotally securing the straight edges of said bottom sections to the body portion, latch members secured to opposite sides of the body portion, each of said latch members being cooperable with the arcuate edge of a bottom section to maintain said section in closed position and being operable at the top of the basket to release said bottom section.

3. A basket of the type described comprising a cylindrical portion open at the ends and a pair of semi-circular bottom sections, a supporting member extending diametrically across the lower end of the cylindrical portion, means pivotally securing the straight edges of said bottom sections to said supporting member, said bottom sections being movable about their pivots to open and closed positions, latch members carried by said cylindrical portion and being cooperable with the arcuate edges of said bottom sections when in closed position to maintain the same in said position, said members being operable from the top of the cylindrical portion to separately release said bottom sections.

4. A basket of the type described comprising a cylindrical body portion open at the ends, a pair of semi-circular bottom sections, a rod having an intermediate portion extending diametrically across the bottom end of the body and having a portion extending upwardly on opposite sides of the body and terminating in eyes to receive the ends of a bail, means for pivotally securing the straight edges of said bottom sections to said intermediate portion of the rod, latch members carried on opposite sides of the body and being cooperable with the arcuate edges of said bottom sections when the same are in closed position to maintain said sections in said position, and said latch members being operable from the top of the basket to separately release said bottom sections.

ROY T. HARRIS.